Patented July 19, 1927.

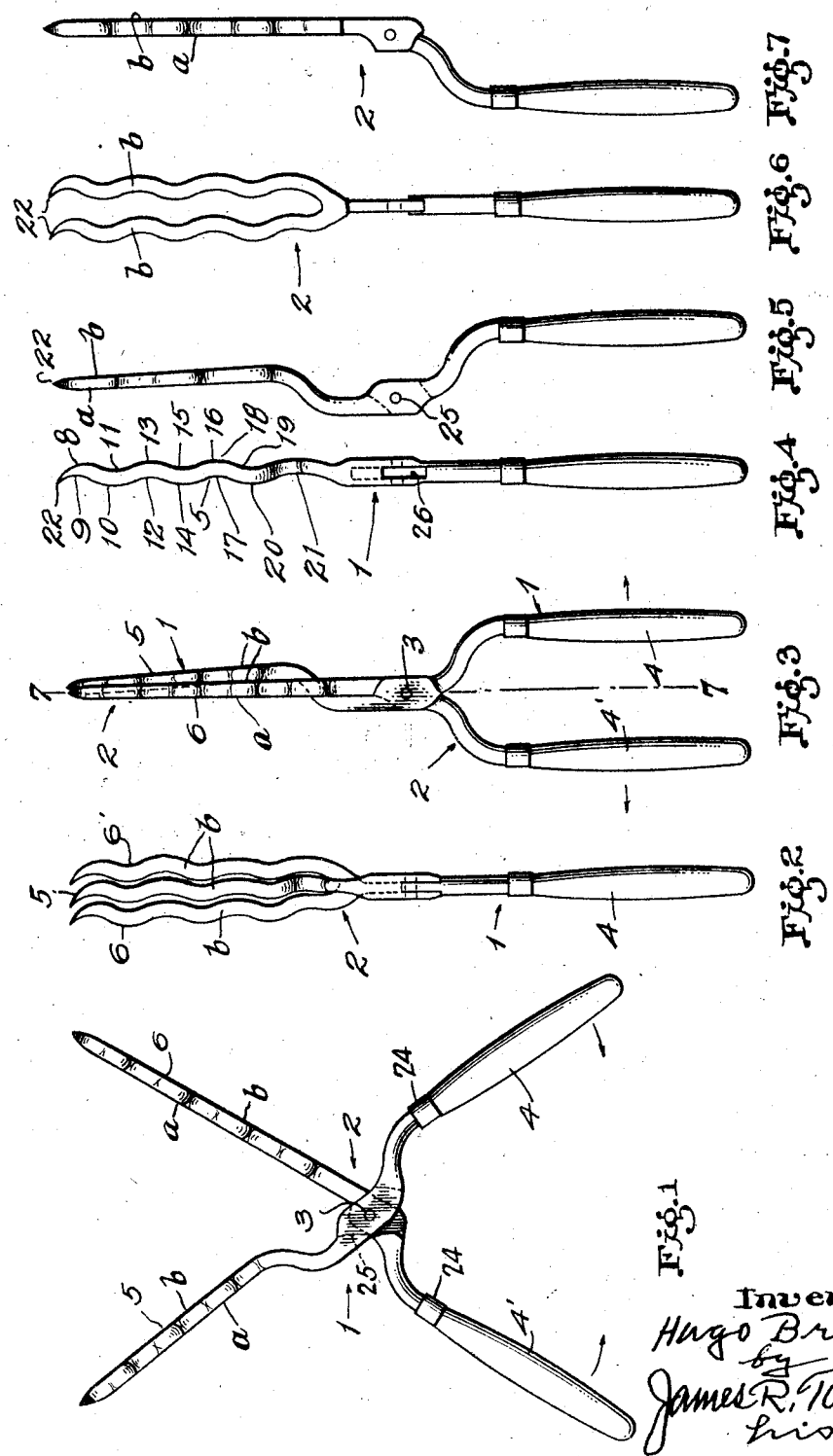

1,636,212

UNITED STATES PATENT OFFICE.

HUGO BROWNE, OF LOS ANGELES, CALIFORNIA.

MARCEL HAIR WAVER.

Application filed February 14, 1923. Serial No. 619,066.

An object of this invention is to provide an improved hair waver adapted for waving one's own hair either before or after it has been combed; and also adapted for use by artists in hair dressing parlors.

Simplicity, safety, ease of operation and perfection of the work performed are objects of the invention.

Hair wavers have heretofore been made of two members having tines and connected by a pivotal joint; and an object of this invention is to provide means of this character whereby the appearance of naturally wavy hair can be obtained by use of a hair waver constructed of a single tine member and a two-tine member pivotally jointed together. I have discovered that in order to produce such appearance, the tines employed for producing the waves must be of a certain diameter, the tine waves of certain radii and the spaces between the tines, of a certain width; and in carrying out the invention according to this discovery, the tines or prongs of my newly invented hair waver are of round steel or other suitable metallic material one quarter of an inch in diameter, each tine tapering to a point at one end, and connected to the handle shank at the other end by an intermediate portion; the intermediate portions of the two members being connected by a pivot, and the tine of one member being spaced from the tines of the other member one-sixteenth of an inch; each tine being formed with lateral curves or bends consisting of concave and convex limbs or sections merging into each other.

The radius of the concave curve is 5/8 of an inch and the convex and concave curves or bends merge into each other. The sides of the two outer tines terminate in parallel planes and the single or inner tine, when viewed from its edge, appears to be between two parallel flat planes; and the tines are pivoted and jointed together in such a manner that when the waver is closed, the single tine extends between and projects beyond the plane of the two tines; and is oblique to such plane so that when the single tine is inserted between the scalp and the hair to be waved, and the waver is closed upon the hair raised by the single tine, the waved edges of the two tines bend the hair over and upon the waved edges of the single tine.

The terminals of the crimping tines are tapered and bent toward one side and when the crimper is closed the intermediate tine, that is the tine carried by one handle and inserted between the tines of the other handle, has an angular relation to the tines between which it is inserted and slants up from the tips of the tines and from the plane of the pivot that unites the two members.

By this arrangement the likelihood of pulling the hair is avoided and the waves are stronger or more prominent as they recede from the scalp.

An object is to start the wave at the scalp and gradually increase the same along the length of the hair, to correspond to the wave of naturally wavy hair.

A feature of the invention resides in terminating the three tines at their free ends, in laterally directed taper points arranged to come to rest practically in the plane of the pivotal axis of the waver when closed with their axes in parallelism and oblique to the axis of the instrument. Between the pointed portion and the butts of the tines of the two-tine member, the space is practically $\frac{1}{16}$ of an inch in width.

An object of the invention is to so construct the hair waver that it will not break, cut or strain any of the hairs of the head and will not pull the hair or hurt the one whose hair is being waved.

A feature of the invention is the construction and arrangement of the tines whereby they invariably produce the attractive wave desired.

This hair waving device may be used by women and girls for dressing or waving the hair, particularly making that peculiar wave known as the Marcel wave, and also for waving the hair after any fashion that the person may desire.

One particular object of this said invention is speed in the operation of waving; the same requiring a mere fraction of the time for such operation commonly necessary in the use of any and all other devices or inventions now in use for such purpose.

When dressing the hair and waving same, by the use of any and all other devices now in use, it is necessary to take the hair down and comb it out in a most elaborate and painstaking manner, consuming much valuable time and involving great labor, and trouble, and an object of this invention is to wave and dress previously dressed hair without taking it down, just using this invention upon the previously dressed hair as it lies ready in its place upon the head.

In the use of all other devices, known to this inventor, the hair is pulled and worked upon with such vigor as to oftentimes cause the subject great pain and discomfort, all this is avoided and escaped and almost totally done away with by the use of this Marcel hair waver.

With the use of this invention the hair is not broken or torn as is the case with all and any other device in use known to this petitioner.

An object is such ease and simplicity of use as will enable any one, child or grown person to use this invention to perfection right from the start.

An object is such simplicity and directness of structure as to insure the waver durability and long life no matter how frequently it may be used.

Other objects, advantages and features of invention may appear from the accompanying drawings, the subjoined detail description and the appended claims.

The accompanying drawings illustrate the invention.

Figure 1 is an edge view of the Marcel hair waver shown open.

Fig. 2 is a view at right angles to Fig. 1, showing the hair waver closed.

Fig. 3 is an edge view of the closed hair waver shown in Figs. 1 and 2.

Fig. 4 is a face view of the single tine member detached.

Fig. 5 is an edge view of the single tine member at right angles to Fig. 4.

Fig. 6 is a face view of the double tine member detached.

Fig. 7 is an edge view of the double tine member at right angles to Fig. 6.

Since the actual and the relative dimensions and spacings of the tines are involved in the attainment of certain objects of this invention, certain dimensions in inches not indicated on the drawings, will be understood from the following description.

The Marcel hair waver comprises a single tine member 1, and a double tine member 2, jointed together by a pivot 3, and each member is provided with an insulated handle as at 4 and 4', of common construction.

The member 1 has a single tine 5 and the member 2 has two tines 6, 6'. The tines are adapted to be separated by spreading the handles 4 apart as indicated in Fig. 1 and by the arrows in Fig. 3; and the single and double tines when the waver is opening may be said to separate from each other on opposite sides of a mid plane 7, produced from the axis of the pivot 3.

The sides $a$, $b$ of the tines are straight and the tines are bent edgewise of the closed waver, into waves as 8, 9, 10, 11, 12, 13, 14, 15, 16, 17, 19, 20, 21; and are formed with pointed terminals 22 that extend obliquely in axial parallelism toward a produced edge line 23 of the waver. This construction is apparent from Figs. 2 and 4.

The purpose of providing the tines with tapered terminal points as at 22, is twofold.

In the first place it is understood that in ordinary use, the tines of the waver will be heated to the appropriate heat and the handles are then grasped by the fingers of one hand, not shown, and the waver opened as in Fig. 1; and that the single tine will then be thrust between the scalp and the strand or body or bunch of hair to be waved at the particular or single waving operation; and such strand, body or bunch being spread properly on the single tine the waver will be closed and held while the heat of the tines is effective to produce the required waves.

The member 1 is a single piece of metal, as iron, brass or steel, while the member 2 of like material is forked as shown in Figs. 3 and 6.

The single thin member is composed of one quarter ($\frac{1}{4}''$) inch round steel or iron, eight and one half ($8\frac{1}{2}''$) inches long, the extreme end 22 tapering to a point. The opposite end is sunken into a nickel plated ring 24 one-half of an inch ($\frac{1}{2}''$) wide and terminating in a wooden handle three and one-half ($3\frac{1}{2}''$) inches long. Three and three quarter ($3\frac{3}{4}''$) inches of the one quarter ($\frac{1}{4}''$) inch round metal is devoted to six waves. Five of said waves are of a seven eighth ($\frac{7}{8}''$) inch radius and one wave tapering to the point is of five eighths ($\frac{5}{8}''$) inch radius as shown. Below the wave there is a five eighth ($\frac{5}{8}''$) inch radius left hand curve, followed by a five eighth ($\frac{5}{8}''$) inch right hand curve; the round iron there being seven eighth ($\frac{7}{8}''$) inch long.

The joint is pressed nine sixteenths ($\frac{9}{16}''$) inch wide and three quarts ($\frac{3}{4}''$) of an inch long with a three sixteenth ($\frac{3}{16}''$) inch hole 3 in its center.

A slot 26 is in the center of the pressed joint, one and three sixteenths ($1\frac{3}{16}''$) inches long and three sixteenths ($\frac{3}{16}''$) of an inch wide. The slot is slanted through the joint at an angle of seven sixteenths ($\frac{7}{16}''$) of an inch radius so as to fit the second piece or part 2 "B" of the curling iron. The joint is followed by a piece of metal one quarter ($\frac{1}{4}''$) of an inch in diameter and there is a fifteen sixteenth ($\frac{15}{16}''$) inch radius from there to a nickel plated one half inch ring ($\frac{1}{2}''$) mounted on a wooden handle three and one-half ($3\frac{1}{2}''$) inches long.

The member 2 is composed of a double fork one quarter ($\frac{1}{4}''$) inch round metal with six (6) parallel waves of the same radius as with member 1; the metal there being devoted to the waves, is four and eleven sixteenths ($4\frac{11}{16}''$) inches long. The parallel forks are three eighths ($\frac{3}{8}''$) of an inch apart. Below the fork, the joint is pressed three sixteenths ($\frac{3}{16}''$) of an inch in thickness; the hole for the pin 3 being five eighths ($\frac{5}{8}''$) of an inch from top of the joint. From center of the three sixteenths ($\frac{3}{16}''$) of an inch hole to where the fork parts, the metal is one and three-sixteenths ($1\frac{3}{16}''$) inches long.

The edges only of the tines or prongs are waved; the sides of the prongs being in a flat plane so that the hair gathered by the single tine of the one tine member will naturally lie in position to be waved when the single tine is inserted under a portion of the hair to be waved.

When the hair is lifted by the single tine, and the waver is closed, and held closed long enough to form the waves, the operator opens the waver and moves it along the strand or wisp of hair to the end of the last wave formed on the waver and the waver is again closed and held to form the waves; and so on until the hair desired to be waved has thus been dressed.

The spaces between the tines throughout the greater portion of their length are of less width than the thickness of the tines so that when the waver is closed as shown in Fig. 3, the strands of the hair are tightly forced together into the waved form, except at the spaces between the taper tips; and those spaces are wider so as not to displace the separate hairs at the roots.

It is noted that when the single tine is brought against the scalp with the waver open as indicated in Fig. 1, there is no tendency to pull the hair and when the waver is closed as indicated in Fig. 3, it does not pull the hair; and that owing to the oblique arrangement of the single tine to the axial plane 7—7 of the waver, a longer wave is given to the hair as the distance from the scalp increases.

It is noted that the joint between the members is so constructed by means of the stop 25 that the crimping tines are uniformly stopped in the same position when the handles are brought as near together as they will go, and an advantage gained by this is that the waving close to the scalp may be more uniform throughout by simply closing the handles as much as possible during each crimping operation.

I claim:

A hair waver comprising a single tine member and a two-tine member pivotally connected, each tine tapering and terminating in a sharp laterally directed point at one end and connected to a handle shank at the other end by an intermediate portion, the intermediate portion of the single tine member being provided with a slanted slot and the two prong member adapted to extend through said slot and being connected by a pivot spaced from the tines of the other member one-sixteenth of an inch, each tine being one-fourth inch in diameter and being formed of lateral curves consisting of concave and convex bends or sections merged into each other; and the convex and concave curves or bends merging into each other, the sides of the two outer tines terminating in parallel planes and the single or inner tine when viewed from its edge appearing to be between two parallel flat planes, the members being so constructed and pivoted together that when the waver is closed the single tine extends between and projects beyond the plane of the two tines and is oblique to such plane so that when the single tine is inserted between the scalp and the hair to be waved, and the waver is closed upon the hair raised by the single tine, the waved edges of the two tines bend the hair over and upon the waved edges of the single tine.

HUGO BROWNE.